(12) United States Patent
Dunn et al.

(10) Patent No.: US 9,840,213 B2
(45) Date of Patent: Dec. 12, 2017

(54) PROGRAMMABLE STANDBY VOLTAGE POWER SUPPLY

(71) Applicant: Continental Automotive Systems, Inc., Auburn Hills, MI (US)

(72) Inventors: Thomas G Dunn, Farmington Hills, MI (US); Mikhail Zarkhin, West Bloomfield, MI (US); Peter A Hatch, Royal Oak, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 605 days.

(21) Appl. No.: 14/457,621

(22) Filed: Aug. 12, 2014

(65) Prior Publication Data

US 2016/0046246 A1    Feb. 18, 2016

(51) Int. Cl.
   *B60R 16/03*    (2006.01)
(52) U.S. Cl.
   CPC .............. *B60R 16/03* (2013.01); *Y02T 10/92* (2013.01)
(58) Field of Classification Search
   CPC ........... G06F 1/26; H02J 1/00; H02M 1/4225; H02M 3/33507; H02M 3/33515; H02M 7/68; H02M 2001/0032; H02M 2001/007; Y02B 70/16; Y02B 70/126; Y10T 307/625

See application file for complete search history.

(56) References Cited

U.S. PATENT DOCUMENTS

| 2008/0010474 A1* | 1/2008 | Chapuis ................ H02M 3/157 713/300 |
| 2011/0234000 A1* | 9/2011 | Yan ........................ H02M 3/157 307/31 |

\* cited by examiner

*Primary Examiner* — Thienvu Tran
*Assistant Examiner* — David M Stables

(57) ABSTRACT

A method and apparatus for controlling a micro power supply in a vehicle includes a processor on the micro power supply communicating with a processor on a microcontroller via a communication link. The communication includes a desired output voltage of the programmable micro power supply. In response to the communicated desired output voltage, the programmable micro power supply adjusts an output voltage of a power converter to be the desired output voltage.

12 Claims, 2 Drawing Sheets

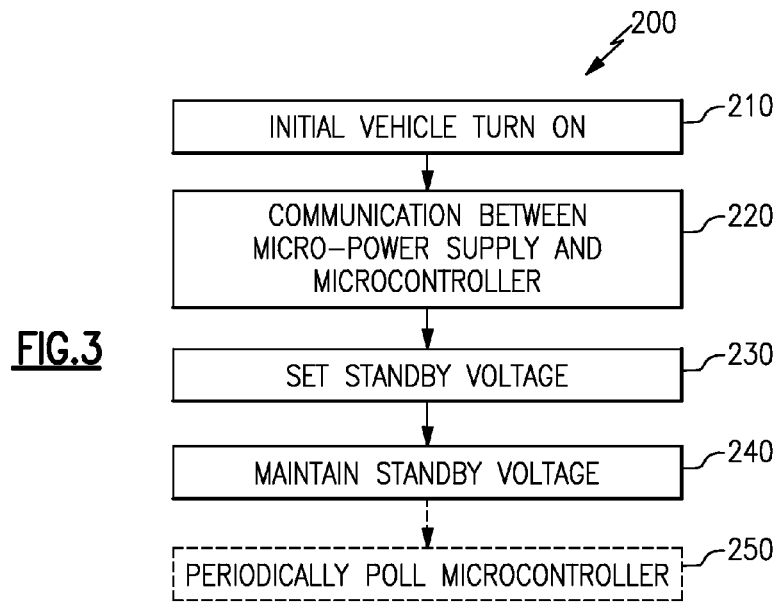
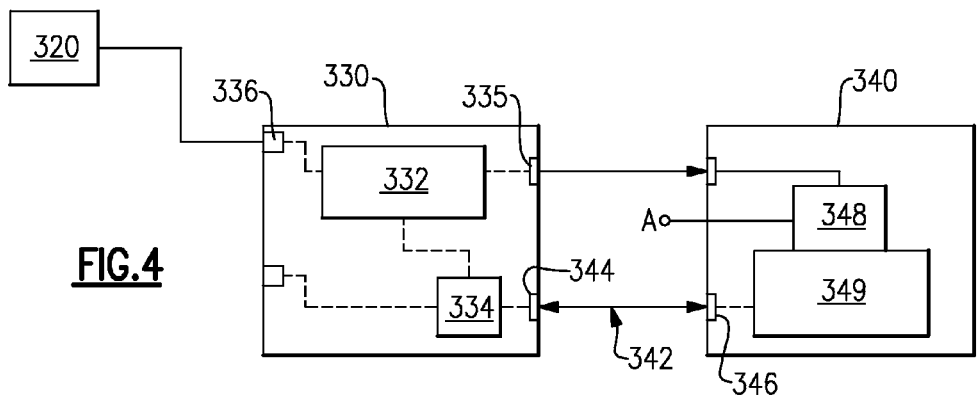
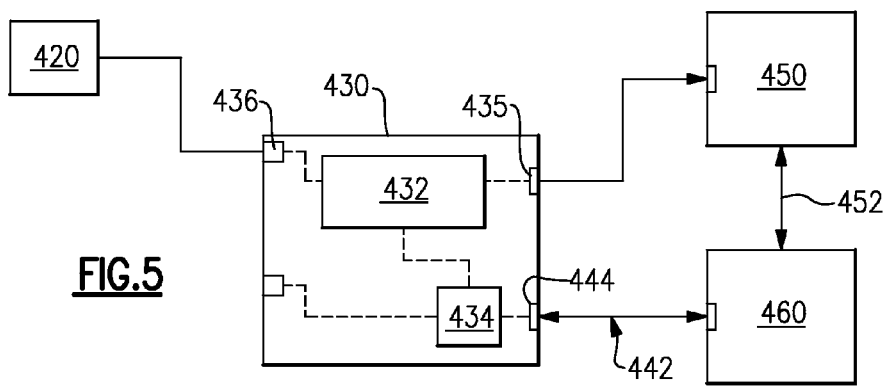

PROGRAMMABLE STANDBY VOLTAGE POWER SUPPLY

TECHNICAL FIELD

The present disclosure relates generally to power supplies for vehicle system controllers, and more specifically to a power supply for providing a standby voltage to at least one vehicle system controller.

BACKGROUND

Electronic systems, such as those present in consumer and commercial vehicles, frequently utilize microcontrollers that operate and control various systems within the vehicle. One common feature included in the microcontrollers is a Standby Random Access Memory (SRAM). The SRAM stores information about a previous operational state of the microcontroller, as well as any other essential data, while the microcontroller is in standby mode. The stored information facilitates fast access of the microcontroller control functions when the microcontroller enters an active control mode from the standby mode. As is understood in the art, in order to maintain the data stored within the SRAM, a constant voltage is provided to the SRAM from an on-board power source.

In some examples, the microcontrollers including an SRAM component are standard components and can use any one of multiple different specific microprocessors to perform the desired control function. Further, the varied microprocessors can each require different standby voltages in order to maintain data within the SRAM. Similarly, a single type of micro power supply can be used to provide power to multiple different control systems, with each control system using different types of microcontrollers having different stand-by voltage requirements. As such, in existing vehicle systems, the microcontroller and the micro power supply are matched during manufacturing to ensure that the proper voltage is supplied by the micro power supply as standby power to the microprocessor.

SUMMARY OF THE INVENTION

Disclosed is a programmable micro power supply comprising: a power conversion circuit having a power supply input and a converted power output, a control circuit coupled to the power conversion circuit and operable to control a conversion rate of the power conversion circuit, and the control circuit having an event occurrence input, and a communication link input.

Also disclosed is a vehicle comprising: an on-board power source, a micro power supply connected to the on-board power source, such that a power conversion circuit in the micro power supply is operable to receive an input voltage from the on board power source and generate an output voltage, different from the input voltage, the micro power supply further including a control circuit operable to control a voltage conversion rate of the power conversion circuit independent of user intervention, a microcontroller communicatively connected to the micro power supply via a communication link, and connected to the output voltage of the power conversion circuit, the microcontroller further including a microcontroller operable to communicate with the control circuit via the communication link, and wherein the microcontroller is operable to communicate a desired power conversion circuit output voltage to the control circuit using the communication link.

Also disclosed is a method for controlling a programmable micro power supply including a control circuit in the programmable micro power supply communicating with a microcontroller in a microcontroller via a communication link, wherein the communication includes a desired output voltage of the micro power supply, and the control circuit adjusting the power conversion rate of a power conversion circuit in the micro power supply independent of user intervention, such that the micro power supply outputs the desired output voltage.

These and other features of the present invention can be best understood from the following specification and drawings, the following of which is a brief description.

BRIEF DESCRIPTION OF THE DRAWINGS

FIG. 3 illustrates a method for operating a micro power supply circuit.

FIG. 4 schematically illustrates a first alternate configuration for a programmable micro power supply.

FIG. 5 schematically illustrates a second alternate configuration for a programmable micro power supply.

DETAILED DESCRIPTION OF AN EMBODIMENT

Figure 1:
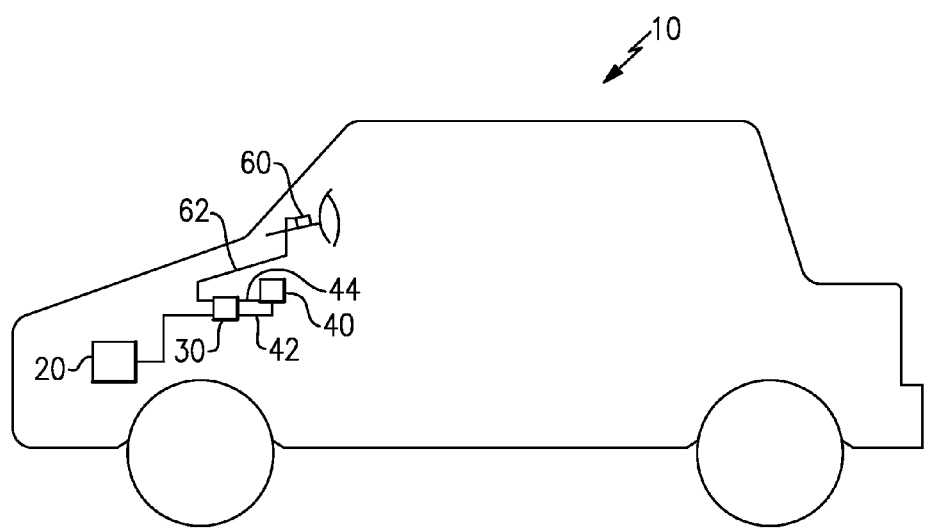
FIG. 1 schematically illustrates an exemplary vehicle.

FIG. 1 schematically illustrates a vehicle 10 including an on-board power source, such as a battery 20. At least one vehicle system is controlled via a microcontroller 40. The microcontroller 40 can operate in an active mode (during active control of the controlled vehicle system) and a standby mode (when the controlled vehicle system is not being actively controlled). The battery 20 and the microcontroller 40 are interconnected via a programmable micro power supply 30 that provides standby power to a memory component of the microcontroller 40 via a standby power supply 44.

The microcontroller 40 also includes a Serial Peripheral Interface (SPI) communication link 42. The SPI communication link 42 allows the microcontroller 40 to communicate with the programmable micro power supply 30 using (SPI) communication protocols. In alternate examples, alternate communication configurations or standards, can be used in place of the SPI communication link 42. The programmable micro power supply 30 is further connected to an ignition system 60 via a communication link 62. While illustrated in the example of FIG. 1 as a direct communication link 62 between the ignition system 60 and the micro power supply 30, practical implementations of the illustrated system can include indirect communication, or other means of communicating the ignition status of the vehicle to the micro power supply 30. In alternate configurations, the communication link 62 can be connected to any vehicle component capable of generating a triggering event and is not limited to the ignition system 60.

Figure 2:
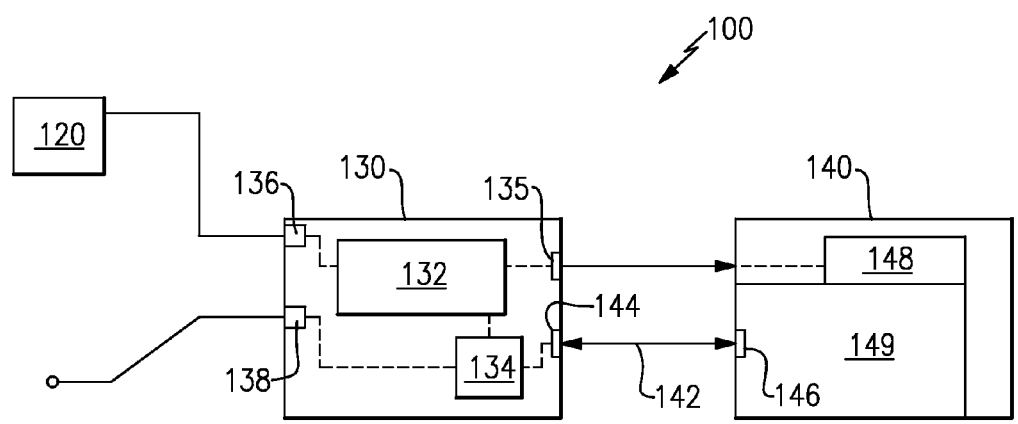
FIG. 2 schematically illustrates a standby power supply circuit for the exemplary vehicle.

FIG. 2 schematically illustrates a standby power supply circuit 100 for an exemplary vehicle system, such as the power supply circuit created by the programmable micro power supply 30 and the microcontroller 40 in the example of FIG. 1. The standby power supply circuit 100 includes a power source, such as a battery 120, and a programmable micro power supply 130. The programmable micro power supply 130 includes a power source input 136 connected to the battery 120. The power source input 136 receives an input voltage for the programmable micro power supply 130 from the battery 120. The input voltage received at the power source input 136 is provided to a power conversion circuit 132 within the programmable micro power supply 130. The power conversion circuit 132 uses a controllable power conversion circuit to adjust the voltage of the power from the battery 120 to a desired output voltage level. The programmable micro power supply 130 outputs power at the desired voltage level through a power output 135.

The programmable micro power supply 130 also includes a control logic circuit 134. The control logic circuit 134 in the illustrated example is a logic circuit capable of communication via a serial peripheral interface and outputting a corresponding control signal. In alternate examples, the control logic circuit 134 can be a microprocessor, or any other computational element. In alternate examples, the control logic circuit 134 is independent of the power conversion circuit 132 and is not contained within the same packaging. The control logic circuit 134 provides a control signal to the power conversion circuit 132, thereby controlling the output voltage of the power conversion circuit 132. The programmable micro power supply 130 includes a vehicle ignition data input 138 that receives a signal indicating an initial turn on of the vehicle in which the standby power supply circuit 100 is located. In alternate examples, alternate triggering events can be utilized in place of the initial vehicle turn on.

While illustrated herein as a single pin input to the control logic circuit 134, one of skill in the art having the benefit of this disclosure will understand that any means of communicating the initial turn on of the vehicle to the control logic circuit 134 can be utilized in place of the illustrated single pin input. When the control logic circuit 134 receives a signal indicating that the vehicle has been turned on for the first time, the control logic circuit 134 communicates with the microprocessor 149 via the SPI communication link 142 to determine specific operating parameters for the microcontroller 140. One of the operating parameters is the required standby voltage for an SRAM memory 148 component of the microcontroller 140.

The programmable micro power supply 130 includes a SPI interface 144. The SPI interface 144 is in communication with a SPI interface 146 on an associated microcontroller 140 via the communication link 142. The microcontroller 140 operates a control function in the vehicle. The SPI interfaces 144, 146 are connected by a SPI communication link 142, such as a SPI interface bus. As described above, in alternative examples, alternate communication protocols from a SPI protocol are utilized to facilitate the communication between the programmable micro power supply 130 and the microcontroller 140.

The microcontroller 140 includes a SRAM portion 148 and a microprocessor 149. The microcontroller 140 can operate in at least two modes: an active control mode and a standby mode. When entering the standby mode, the microprocessor 149 stores operating parameters and other data in the SRAM 148. When exiting the standby mode, the microprocessor 149 uses the stored operating parameters of the microprocessor 149 and essential data to facilitate quick startup of the control functions. As described above, the microprocessor 149 of the microcontroller 140 communicates with the control logic circuit 134 in the programmable micro power supply 130 via the SPI communication link 142.

In practical implementations, the microcontroller 140 can be any number of different microcontrollers 140, with each of the various microcontrollers 140 requiring a different standby voltage to maintain the data stored in the SRAM 148. In order to accommodate the various required standby voltages without requiring multiple different micro power supplies 130, the control logic circuit 134 on the programmable micro power supply 130 communicates with the microprocessor 149 on the microcontroller 140 at an initial engine startup using the SPI communication link 142. The communication informs the control logic circuit 134 of the required standby voltage for maintaining the SRAM 148 in the microcontroller 140. The control logic circuit 134 then adjusts the power conversion circuit 132 to output a desired standby voltage. The specific adjustments are determined using a software module in the control logic circuit 134 and corresponding circuit in the power conversion circuit 132. The adjustments do not require physical modifications to the power conversion circuit 132 or the inputs/outputs of the programmable micro power supply 130. In one example, the adjustment is performed by opening or closing switches, such as transistors, in a switch network in the power conversion circuit 132. By opening and closing select switches, the control logic circuit 134 can control and alter the output voltage of the power conversion circuit 132.

With continued reference to FIGS. 1 and 2, FIG. 3 illustrates a method 200 for operating the apparatus of FIGS. 1 and 2. When the vehicle 10 is turned on for the first time, the method enters an "Initial Vehicle Turn On" step 210. The initial vehicle turn on is communicated to the micro power supply via the vehicle ignition data input 138. The initial vehicle turn on can occur at a manufacturing facility, repair facility, end user activation, or any other point.

When the programmable micro power supply 130 recognizes that the vehicle 10 has been turned on for the first time, communication between the micro power supply 130 and the microcontroller 140 is initiated in a "Communication Between Micro-Power Supply and Microcontroller" step 220. As described above, the communication in the exemplary embodiment is via an SPI communication link, and follows standard SPI protocols. During this step 220, the microcontroller 140 communicates the required standby voltage to properly store data in the SRAM 148 portion of the microcontroller 140 to the micro power supply 130. Additional information can also be exchanged during this step as per the needs of the particular system.

Once the required standby voltage, as well as any other pertinent information, has been communicated between the microcontroller 140 and the programmable micro power supply 130, the control logic circuit 134 within the programmable micro power supply 130 adjusts the power conversion circuit 132 to set the voltage of the power output 135 in a "Set Standby Voltage" step 230. The output standby voltage is then maintained at the required voltage level by the programmable micro power supply 130 in a "Maintain Standby Voltage" step 240. Prior to the set standby voltage step 230, the output voltage of the power output 135 is a default output voltage. The default output voltage is determined during manufacture. In some examples, the default standby voltage is set to the most common required standby voltage of compatible microcontrollers. In alternate examples, the default standby voltage can be set to be at least as high as the highest compatible microcontroller.

In the above exemplary embodiment, the standby voltage is updated from the default standby voltage at the initial vehicle turn on and maintained without further polling of the microcontroller 140.

In some example embodiments, an optional "Periodically Poll Microcontroller" step 250 is implemented. During the periodically poll microcontroller step 250, the programmable micro power supply 130 periodically communicates with the microcontroller 140 using the SPI interface 144, 146. During the periodic communication, the programmable micro power supply 130 verifies that the required standby voltage currently stored in the control logic circuit 134 is correct. If the stored required standby voltage and the communicated required standby voltage are different, the programmable micro power supply 130 updates the stored required standby voltage to match the communicated required standby voltage.

In systems implementing the optional periodically poll microcontroller step 250, the microcontroller 140 can be polled at any desired period. In some examples, the programmable micro power supply 130 can poll the microcontroller every 2, 5 or 10 seconds, or even more frequently. In this example, the polling detects when the stored data has become corrupted, causing the stored standby voltage to differ from the required standby voltage. This corruption can occur from any number of sources including, but not limited to voltage spikes and poor weather conditions.

In alternate examples, the periodically poll microcontroller step 250 can be performed each time the vehicle is started or when any other triggering event occurs. In this example, the periodic polling determines when a new microcontroller 140 has been connected, and updates the required standby voltage stored in the micro power supply 130 to correspond to the updated requirements of the new microcontroller 140.

One of skill in the art, having the benefit of the above disclosure, will understand that each of the two example embodiments of the periodically poll microcontroller step 250 are non-exclusive and can be combined with each other, or with other periodic polling schemes to allow for both detecting and repairing corrupted values and to provide for updating the programmable micro power supply 130 when a new microcontroller is connected.

The programmable micro power supply 130 of FIG. 2 can be further utilized as a programmable voltage source for alternative systems beyond the standby power supply circuit illustrated in FIG. 1.

With continued reference to FIG. 2, FIG. 4 illustrates one such alternate use of a programmable micro power supply 330. The programmable micro power supply 330 is connected to a battery 320, or other on board power source, via a power source input 336. The power input from the power source 320 is converted to an output power voltage by a power conversion circuit 332, and is output from the programmable micro power supply 330 at a power output 335. The programmable micro power supply 330 further includes a control logic circuit 334 that controls the micro power supply 330. As with the example of FIG. 2, the control logic circuit 334 can be replaced with a microprocessor or any other computational element in alternative examples. The control logic circuit 334 is capable of controlling and adjusting the power conversion rate of the conversion circuit 332, as described above with regards to the power conversion circuit 132 of FIG. 2. The programmable micro power supply 330 further includes a SPI interface 344 connected to the control logic circuit 334.

Connected to the programmable micro power supply 330 at the power output 335 and the SPI interface 344 is a microcontroller 340. The microcontroller 340 includes a microprocessor 249. Unlike the microcontroller 140 of FIG. 2, the microcontroller 340 includes an Analog to Digital (A/D) converter 348 that receives an analog sensor input A and converts the analog sensor input to a digital signal readable by an on-board microprocessor 349. The analog sensor input A can be any analog input signal including, but not limited to, sensor signals for any number of vehicle sensor systems. As is understood in the art, Analog to Digital converters, such as the Analog to Digital converter 348, require a reference voltage input. The reference voltage input controls the range and resolution (volts/counts) of the converter. Lowering the voltage of the reference voltage input, decreases the range of the Analog to Digital converter but increases the resolution of the Analog to Digital converter. The more frequently the incoming signal is sampled, the higher the resolution of the digital output.

The digital output is then provided to the microprocessor 349 on the microcontroller 340 in digital form. The microprocessor 249 utilizes the converted digital sensor signal to interpret the sensor readings and determine corresponding control responses for a controlled system according to known control techniques. The microprocessor 349 further includes a SPI interface 346 that communicates with the SPI interface 344 of the micro power supply 330. In the example of FIG. 4, the microprocessor 349 of the microcontroller 340 communicates with the control logic circuit 334 of the micro power supply 330, and directs the micro power supply 330 what the voltage at the voltage output 335 should be at any given time.

By allowing the microprocessor 349 to communicate a required reference voltage to the programmable micropower supply 330, the SPI communication link 342 allows the microprocessor 349 to adjust the range and resolution as needed at any given time. By way of example, when a larger margin of error or response time in the microcontroller 340 is acceptable, the resolution can be lowered, thereby saving processor power and energy. Similarly, during critical control operations, the resolution can be increased by decreasing the reference voltage.

With continued reference to FIG. 2, FIG. 5 illustrates one such alternate use of a programmable micro power supply 430. The programmable micro power supply 430 is connected to a battery 420, or other on board power source, via a power source input 436. The power input from the power source 420 is converted to an output power voltage by a power conversion circuit 432, and is output from the programmable micro power supply 430 at a power output 435. The programmable micro power supply 430 further includes a control logic circuit 434 that controls the micro power supply 430. The control logic circuit 434 is capable of controlling and adjusting the power conversion rate of the conversion circuit 432, as described above with regards to the power conversion circuit 132 of FIG. 2. The programmable micro power supply 430 further includes a SPI interface 444 connected to the control logic circuit 434.

In the example of FIG. 5, the power supply output 435 is provided to a low power microcontroller 450. The low power microcontroller 450 has a reduced processing capacity compared to a standard microcontroller. Accompanying the reduced processing power is reduced energy expenditure during the processing. A standard microcontroller 460 operates as the microcontroller for a controlled system during modes requiring significant controls. The standard microcontroller 460 is overpowered for operational modes requiring no controls or light controls. As such, utilizing the standard microcontroller 460 in these modes entails wasted energy.

To address the excess energy usage, the standard microcontroller 460 instructs the programmable micro power supply 430 to provide a power output of the appropriate voltage to the low power microcontroller 450 and enters a sleep mode when the full processing power of the standard microcontroller 460 is not needed. The standard microcontroller 460 communicates with the micro power supply 430 via the SPI communication link 442.

The low power microcontroller 450 and the standard microcontroller 460 communicate with each other via a communication link 452 using any standard microprocessor communication protocol. When the standard microcontroller 460 enters the sleep mode, the standard microcontroller 460 communicates with the micro power supply 430 via the SPI communication link 434 and sets the power output 435 at a desired level to operate the low power microcontroller 450. During the sleep mode, the low power microcontroller 450 monitor's vital sensors, or performs other low power tasks that do not require the full processing power of the standard microprocessor 460.

The low power microcontroller 450 is capable of signaling the standard microcontroller 460 to exit shutdown when the monitored signals, or other vital processes, require the full processing power of the standard microcontroller 460. In this way, the energy expenditure of the overall system can be reduced during time periods where only minimal processing power is required, while still allowing for the full processing power of the standard microcontroller 460 when needed.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A system for a vehicle having an on-board power source, the system comprising:
   a micro power supply configured to connect to said on-board power source, the micro power supply including a power conversion circuit operable to receive an input voltage from said on board power source and generate an output voltage, different from said input voltage, the micro power supply further including a control circuit operable to control a voltage conversion rate of the power conversion circuit independent of user intervention; and
   a microcontroller communicatively connected to said micro power supply via a communication link, and connected to the output voltage of the power conversion circuit, the microcontroller further including a processor operable to communicate with said control circuit via the communication link;
   wherein the microcontroller is operable to communicate a desired power conversion circuit output voltage to said control circuit using said communication link, and
   wherein the microcontroller further comprises at least one of
      a sensor input operable to receive an analog sensor signal, and analog to digital converter operable to convert the received analog sensor signal to a digital signal, wherein the output voltage of the power conversion circuit is a reference voltage for the analog to digital converter for controlling range and resolution of the analog to digital converter, and
      a standard microcontroller and a low power microcontroller connected to said standard microcontroller via a communication link and connected to the output voltage of the micro power supply, wherein the low power microprocessor is operable to activate said standard microcontroller using said communication link and the standard microcontroller is coupled to the micro power supply via the communication link for instructing the micro power supply to provide the output voltage of the power conversion circuit to the low power microcontroller.

2. The system of claim 1, wherein the communication link is a Serial Peripheral Interface (SPI) communication link.

3. The system of claim 1, wherein the microcontroller includes a tangible memory storing instructions operable to cause the microcontroller to communicate a first desired reference voltage to said control circuit under a first condition and to communicate a second desired reference voltage to said control circuit under a second condition.

4. The system of claim 3, wherein the first condition is a first desired sampling resolution and wherein the second condition is a second desired sampling resolution.

5. A system for a vehicle having an on-board power source, the system comprising:
   a micro power supply configured to connect to said on-board power source, such that a power conversion circuit in said micro power supply is operable to receive an input voltage from said on board power source and generate an output voltage, different from said input voltage, the micro power supply further including a control circuit operable to control a voltage conversion rate of the power conversion circuit independent of user intervention; and
   a microcontroller communicatively connected to said micro power supply via a communication link, and connected to the output voltage of the power conversion circuit, the microcontroller further including a processor operable to communicate with said control circuit via the communication link;
   wherein the microcontroller is operable to communicate a desired power conversion circuit output voltage to said control circuit using said communication link,
   wherein the microcontroller further comprises a stand-by random access memory (SRAM) connected to said microcontroller and wherein said SRAM connected to the output voltage of the power conversion circuit, such that the output voltage of the power conversion circuit provides a standby voltage operable to maintain data stored in said SRAM, and
   wherein said microcontroller is operable to communicate a required standby voltage to said control circuit via said communication link, and wherein said control circuit is operable to set the output voltage of the power conversion circuit at the required standby voltage in response to said communicated standby voltage.

6. The system of claim 5, wherein the control circuit includes a tangible memory storing instructions operable to cause the control circuit to perform the steps of:
   polling the microcontroller for a required standby voltage when the control circuit receives an event occurrence input for the first time; and
   adjusting the power conversion circuit such that the output voltage of the power conversion circuit is the required standby voltage.

7. The system of claim 6, wherein the tangible memory stores instructions operable to cause the control circuit to further perform the step of:
   periodically polling the microcontroller for the required standby voltage, and adjusting a required standby voltage stored in said control circuit to be a standby voltage received in response to the polling when the standby voltage received in response to the polling and the stored standby voltage are different.

8. A method for controlling a programmable micro power supply comprising:
- a control circuit in said programmable micro power supply communicating with a microcontroller via a communication link, wherein the communication includes receiving a desired output voltage of the micro power supply from the microcontroller;
- the control circuit adjusting the power conversion rate of a power conversion circuit in the micro power supply independent of user intervention, such that the micro power supply outputs the desired output voltage;
- periodically polling said microcontroller for the required output voltage; and
- adjusting the output voltage of the micro power supply when a desired output voltage received in response to said periodic polling differs from a current output voltage of the micro power supply.

9. The method of claim 8, wherein the communication link is a Serial Peripheral Interface (SPI) link.

10. The method of claim 8, wherein the periodic polling occurs at least each time a triggering event occurs.

11. The method of claim 8, wherein the periodic polling occurs at least at a predetermined interval.

12. The method of claim 8, further comprising:
- receiving an event occurrence signal at the control circuit; and
- determining that the event occurrence is the first instance of the event occurring using said control circuit, wherein the control circuit adjusting the power is performed in response to said determination.

\* \* \* \* \*